United States Patent
Lee et al.

(10) Patent No.: US 8,887,240 B2
(45) Date of Patent: Nov. 11, 2014

(54) WIRELESS NETWORK SECURITY SYSTEM

(71) Applicant: UNETsystem, Inc., Seoul (KR)

(72) Inventors: Sang Jun Lee, Seoul (KR); Seong Yun Ham, Seoul (KR)

(73) Assignee: UNETsystem, Inc., Seoul (KR)

( * ) Notice: Subject to any disclaimer, the term of this patent is extended or adjusted under 35 U.S.C. 154(b) by 0 days.

(21) Appl. No.: 13/729,725

(22) Filed: Dec. 28, 2012

(65) Prior Publication Data

US 2014/0157364 A1 Jun. 5, 2014

(30) Foreign Application Priority Data

Nov. 30, 2012 (KR) .................. 10-2012-0138106

(51) Int. Cl.
*G06F 7/04* (2006.01)
*H04W 12/12* (2009.01)

(52) U.S. Cl.
CPC .................................... *H04W 12/12* (2013.01)
USPC ........................................................... 726/3

(58) Field of Classification Search
CPC .......... H04L 63/08; H04L 63/10; H04L 63/20
USPC ............................................................ 726/3
See application file for complete search history.

(56) References Cited

U.S. PATENT DOCUMENTS

| | | | | |
|---|---|---|---|---|
| 8,032,939 | B2* | 10/2011 | Palnitkar et al. | 726/25 |
| 2009/0119776 | A1* | 5/2009 | Palnitkar et al. | 726/25 |
| 2010/0100930 | A1* | 4/2010 | King | 726/1 |
| 2012/0185390 | A1* | 7/2012 | Palnitkar et al. | 705/44 |
| 2013/0282579 | A1* | 10/2013 | Palnitkar et al. | 705/44 |

* cited by examiner

*Primary Examiner* — Teshome Hailu
(74) *Attorney, Agent, or Firm* — Jefferson IP Law, LLP

(57) ABSTRACT

A wireless network security system with a plurality of communication terminals including an Access Point (AP) and a station is provided. The wireless network security system includes a plurality of sensor devices for collecting identification information of the communication terminals, and a WIPS server communicating with the sensor devices, for transmitting a control signal to the communication terminals, wherein the WIPS server transmits the control signal to the plurality of communication terminals through the sensor devices, and when a control signal for blocking connection of two or more communication terminals among the plurality of communication terminals associated through a network is transmitted, connection blockage packets different from one another is created and sequentially and repeatedly transmitted.

4 Claims, 1 Drawing Sheet

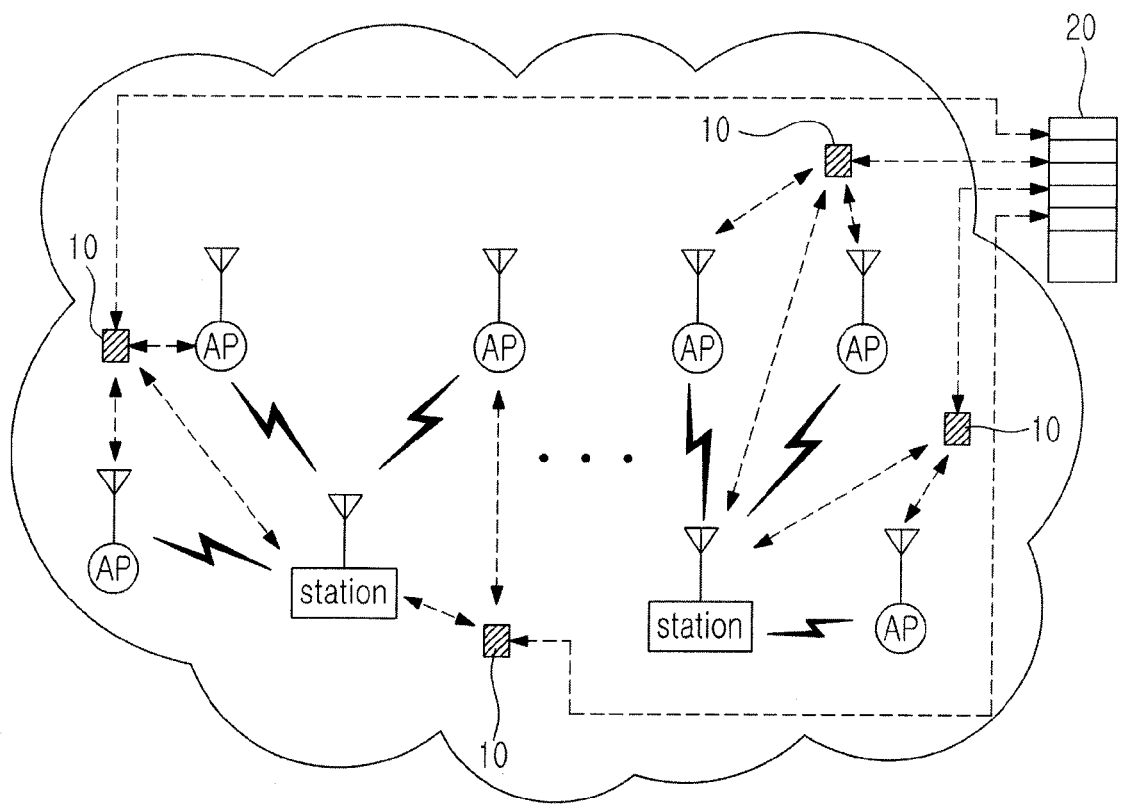

WIRELESS NETWORK SECURITY SYSTEM

PRIORITY

This application claims the benefit under 35 U.S.C. §119 (a) of a Korean patent application filed on Nov. 30, 2012 in the Korean Intellectual Property Office and assigned Serial No. 10-2012-0138106, the entire disclosure of which is hereby incorporated by reference.

BACKGROUND OF THE INVENTION

1. Field of the Invention

The present invention relates to a wireless network security system.

2. Background of the Related Art

As the types of cyber attacks through the Internet are diversified and complicated recently, the cyber attacks are difficult to effectively detect and counteract with a single security system.

Accordingly, integrated security management techniques and integrated control systems are proposed in order to systematically associate and automatically manage single security systems in an integrated manner.

However, it is difficult to protect cyber attacks made through a global wide area network such as the Internet using a manual security management system which manages only a limited single security management area in a centralized manner.

Furthermore, a Distributed Denial of Service (DDoS) attack is regarded as a very serious network security issue.

It is difficult to distinguish DDoS attacks from normal traffics, and thus the DDoS attacks are difficult to predict in advance, and the extent of damage is enormous throughout the network.

In addition, since most of the DDoS attacks are being developed as a bandwidth consuming attack which flows a large amount of malicious traffics into the network and depletes resources of the entire network, they arouse very serious problems from the aspect of network resources as well as network security.

More particularly, the DDoS attack flows malicious traffics into a transport network as they are although the malicious packets are blocked in an attacked domain, the problem of congestion and resource depletion in the entire network is not solved, and recently developed wireless networks, which are configured of Access Points (APs), relays and stations, are extremely vulnerable to network attacks.

Accordingly, serious problems that cannot be solved using a local security structure of the prior art are introduced. In this situation, there is no method that can perfectly predict and cope with all kinds of DDoS and other network attacks in practice, and thus required is a technique for predicting and coping with the attacks so as to minimize loss of network resources and services incurred by various network attacks.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address the above-mentioned problems and/or disadvantages and to provide at least the advantages described below. Accordingly, an aspect of the present invention is to provide a wireless network security system, in which connection blockage packets for blocking connection between any two or more communication terminals among a plurality of communication terminals connected through a wireless network are prepared in different formats and sequentially and repeatedly transmitted, and thus reliability of connection blocking control is improved.

Another aspect of the present invention is to provide a wireless network security system, in which network connection of a blockage target is disallowed according to transmission of the connection blockage packets, and thus network connection of illegal stations or unauthorized APs are fundamentally blocked.

According to an aspect of the present invention, a wireless network security system provided with a plurality of communication terminals including an Access Point (AP) and a station is provided. The system includes a plurality of sensor devices for collecting identification information of the communication terminals, and a WIPS server communicating with the sensor devices, for transmitting a control signal to the communication terminals, wherein the WIPS server transmits the control signal to the plurality of communication terminals through the sensor devices, and when a control signal for blocking connection of two or more communication terminals among the plurality of communication terminals associated through a network is transmitted, connection blockage packets different from one another is created and sequentially and repeatedly transmitted.

Here, the connection blockage packet can be categorized into a first connection blockage packet containing information on Basic Service Set Identifier (BSSID) of a target communication terminal among the communication terminals and information on a command for blocking connection between the target communication terminal and other communication terminals connected to the target communication terminal, and a second connection blockage packet containing the information on BSSID of the target communication terminal among the communication terminals, identification information of one or more specified communication terminals connected to the target communication terminal, and information on a command for blocking connection between the target communication terminal and the specified communication terminals In addition, the second connection blockage packet can be categorized into a 2-1 connection blockage packet for requesting blockage of connection from an AP to a station and a 2-2 connection blockage packet for requesting blockage of connection from a station to an AP.

Here, the WIPS server may sequentially and repeatedly transmit the first connection blockage packet, the 2-1 connection blockage packet and the 2-2 connection blockage packet through the sensor device.

Meanwhile, the first connection blockage packet can be propagated in a broadcast method, and the second connection blockage packet can be propagated in a unicast or multicast method.

According to the present invention, connection blockage packets for blocking connection between any two or more communication terminals among a plurality of communication terminals connected through a wireless network are prepared in different formats and sequentially and repeatedly transmitted, and thus reliability of connection blocking control is improved.

In addition, network connection of a blockage target is disallowed according to transmission of the connection blockage packets, and thus network connection of illegal stations or unauthorized APs are fundamentally blocked.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of the present invention will be apparent from the following description taken in conjunction with the accompanying drawings, in which:

FIG. 1 is a view showing the configuration of a wireless network security system according to an exemplary embodiment of the present invention.

Throughout the drawings, it should be noted that like reference numbers are used to depict the same or similar elements, features, and structures.

DETAILED DESCRIPTION OF THE EXEMPLARY EMBODIMENT

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

First, terms used herein are defined in consideration of functions in the present invention, and therefore, the terms will be construed as concepts corresponding to the spirit of the present invention and conventional meanings.

Accordingly, while exemplary embodiments are capable of various modifications and alternative forms, exemplary embodiments thereof are shown by way of example in the drawings and will herein be described in detail. It should be understood, however, that there is no intent to limit exemplary embodiments to the particular fauns disclosed, but to the contrary, exemplary embodiments are to cover all modifications, equivalents, and alternatives falling within the scope of exemplary embodiments. Like numbers refer to like elements throughout the description of the figures.

FIG. 1 is a view showing the configuration of a wireless network security system according to an exemplary embodiment of the present invention.

Here, a station is a concept including a variety of constitutional components configuring a wireless network, e.g., communication terminals such as a base station, a relay, a user terminal and the like. Hereinafter, an AP and a station are specified as an inclusive concept of the communication terminal unless otherwise required.

Referring to FIG. 1, in a wireless network security system according to an exemplary embodiment of the present invention provided with a plurality of communication terminals including Access Points (APs) and stations, the wireless network security system includes a plurality of sensor devices 10 for collecting identification information of the communication terminals, and a Wireless Intrusion Prevention System (WIPS) server 20 communicating with the sensor device 10 and transmitting a control signal to the communication terminals. The WIPS server 20 transmits the control signal to the plurality of communication terminals through the sensor device 20.

When a control signal for blocking connection of two or more communication terminals among a plurality of communication terminals connected through a network is transmitted, connection blockage packets different from one another are created and sequentially and repeatedly transmitted.

Here, the sensor device 10, which is in association with a variety of communication terminals configuring the wireless network, collects information unique to the communication terminals (a MAC address, a product name, a manufacturer, a serial number, or the like) and transmits the collected information to the WIPS server 20 described below. In addition, the sensor device 10 receives control signals transferred from the WIPS server 20 for each of the communication terminals and propagates the control signals to corresponding communication terminals.

In addition, the WIPS server 20 blocks connection of illegal and unauthorized communication terminals in the wireless network. The WIPS server 20 communicates in association with the sensor device 10, receives the information unique to the communication terminals from the sensor device 10 and stores the unique information. When a communication terminal needs to be controlled, the WIPS server 20 manages connection of the communication terminal to the wireless network by transmitting a control signal to the communication terminal.

Here, when an attacking communication terminal attacking through hacking is sensed, the WIPS server 20 creates and propagates a connection blockage packet to a corresponding communication terminal in order to block connection of the attacking communication terminal to the network and connection between the attacking communication terminal and other communication terminals.

A conventional method of blocking connection of a communication terminal to a network by transmitting a connection blockage packet has implemented the connection blockage packet in a broadcast method in order to block connection between an attacking communication terminal and a communication terminal associated with the attacking communication terminal.

However, the conventional method of blocking connection has a problem in that the connection is maintained if the attacking communication terminal ignores the connection blockage packet or tries reconnection after a predetermined time interval. The wireless network security system according to the present invention creates different connection blockage packets and sequentially and repeatedly propagates the connection blockage packets in order to solve the problem of the conventional method.

Describing in further detail, the connection blockage packets may be categorized into a first connection blockage packet containing information on Basic Service Set Identifier (BSSID) of a target communication terminal among the communication terminals and information on a command for blocking connection between the target communication terminal and all the other communication terminals connected to the target communication terminal, and a second connection blockage packet containing the information on Basic Service Set Identifier (BSSID) of the target communication terminal among the communication terminals, identification information of one or more specified communication terminals connected to the target communication terminal, and information on a command for blocking connection between the target communication terminal and the specified communication terminals.

Here, the Basic Service Set Identifier (BSSID) uses 48 bits to distinguish a specific Basic Service Set (BSS). In the case of a BSS network, the BSSID is a Medium Access Control (MAC) address of an AP device, and in the case of an Independent BSS or ad hoc network, the BSSID is a randomly created value.

Here, since the WIPS server 20 stores the MAC address and the unique information of the target communication terminal (it refers to an AP here, but not limited to the AP) through the sensor device 10, the WIPS server 20 tries to block connection of all communication terminals connected to the target communication terminal by creating the first connection blockage packet and transferring the first connection blockage packet to the target communication terminal through the sensor device 10.

Here, the WIPS server 20 creates the second connection blockage packet, and the second connection blockage packet contains information on the target communication terminal, information on one or more of the specified communication terminals connected to the target communication terminal and information on a command for blocking connection between the target communication terminal and the specified communication terminals.

More specifically, the second connection blockage packet can be categorized into a 2-1 connection blockage packet for requesting blockage of connection from an AP to a station and a 2-2 connection blockage packet for requesting blockage of connection from a station to an AP. The WIPS server 20 may implement blockage of connection of the target communication terminal or blockage of connection between the target communication terminal and a specified communication terminal by sequentially and repeatedly transmitting the first connection blockage packet, the 2-1 connection blockage packet and the 2-2 connection blockage packet through the sensor device 10.

Here, the first connection blockage packet can be propagated in a broadcast method, and the second connection blockage packet can be propagated in a unicast or multicast method.

That is, in implementing blockage of connection of the target communication terminal or blockage of connection of a specified communication terminal connected to the target communication terminal, the first connection blockage packet of the broadcast method is propagated, and then the second connection blockage packets (the 2-1 connection blockage packet and the 2-2 connection blockage packet) are sequentially propagated. Since the connection blockage packets are sequentially and repeatedly transmitted, corresponding communication terminals perform the connection blockage command based on the connection blockage packets of three different formats, and thus network connection of a communication terminal which ignores the connection blockage packets or reconnects after a predetermined time interval can be efficiently prevented.

As described above, in the wireless network security system according to the present invention, connection blockage packets for blocking connection between any two or more communication terminals among a plurality of communication terminals connected through a wireless network are prepared in different formats and sequentially and repeatedly transmitted, and thus reliability of connection blocking control is improved.

In addition, network connection of a blockage target is disallowed according to transmission of the connection blockage packets, and thus network connection of illegal stations or unauthorized APs are fundamentally blocked.

While the present invention has been described with reference to the certain exemplary embodiments thereof, it will be understood by those skilled in the art that various changes in form and details may be made therein without departing from the scope and spirit of the present invention as defined by the appended claims and their equivalents.

What is claimed is:

1. A wireless network security system provided with a plurality of communication terminals including Access Points (APs) and stations, the system comprising:
    a plurality of sensor devices configured to collect identification information of the communication terminals; and
    a Wireless Intrusion Prevention System (WIPS) server configured to communicate with the sensor devices, and to transmit a control signal to the communication terminals,
    wherein the WIPS server transmits the control signal to the plurality of communication terminals through the sensor devices, and when a control signal for blocking connection of two or more communication terminals among the plurality of communication terminals connected through a network is transmitted, at least a first connection blockage packet corresponding to a first category and at least a second connection blockage packet corresponding to a second category are created and sequentially and repeatedly transmitted,
    wherein the first connection blockage packet contains information on Basic Service Set Identifier (BSSID) of a target communication terminal among the communication terminals and information on a command for blocking connection between the target communication terminal and other communication terminals connected to the target communication terminal, and
    wherein the second connection blockage packet contains the information on Basic Service Set Identifier (BSSID) of the target communication terminal among the communication terminals, identification information of one or more specified communication terminals connected to the target communication terminal, and information on a command for blocking connection between the target communication terminal and the specified communication terminals.

2. The system according to claim 1, wherein the second connection blockage packet is one of a 2-1 connection blockage packet for requesting blockage of connection from an AP to a station, and a 2-2 connection blockage packet for requesting blockage of connection from a station to an AP.

3. The system according to claim 2, wherein the WIPS server sequentially and repeatedly transmits the first connection blockage packet, a 2-1 connection blockage packet and a 2-2 connection blockage packet through the sensor device.

4. The system according to claim 1, wherein the first connection blockage packet is propagated in a broadcast method, and the second connection blockage packet is propagated in a unicast or multicast method.

\* \* \* \* \*